US008359128B1

(12) United States Patent  
Segal et al.

(10) Patent No.: US 8,359,128 B1  
(45) Date of Patent: Jan. 22, 2013

(54) SOLAR ENERGY COLLECTION FLIGHT PATH MANAGEMENT SYSTEM FOR AIRCRAFT

(75) Inventors: Matthew Jonathan Segal, Calabasas, CA (US); Kevin Andrew Wise, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 5 days.

(21) Appl. No.: 13/182,065

(22) Filed: Jul. 13, 2011

(51) Int. Cl.
*G01C 23/00* (2006.01)
*G05D 1/00* (2006.01)
*G05D 3/00* (2006.01)
*G06F 7/00* (2006.01)
*G06F 17/00* (2006.01)

(52) U.S. Cl. .................. 701/3; 701/4; 701/10
(58) Field of Classification Search .......... 701/3, 4, 701/10
See application file for complete search history.

(56) References Cited

U.S. PATENT DOCUMENTS

| | | | |
|---|---|---|---|
| 2,102,587 A | 12/1937 | Eliel | |
| 4,747,567 A * | 5/1988 | Johnson et al. | 244/172.6 |
| 5,810,284 A | 9/1998 | Hibbs et al. | |
| 6,115,580 A * | 9/2000 | Chuprun et al. | 455/1 |
| 6,481,671 B1 * | 11/2002 | Blair | 244/168 |
| 6,942,186 B1 * | 9/2005 | Levin et al. | 244/158.2 |
| 7,073,749 B2 * | 7/2006 | Krill et al. | 244/2 |
| 7,185,856 B2 * | 3/2007 | Bang et al. | 244/168 |
| 7,278,607 B2 * | 10/2007 | Fuller | 244/30 |
| 7,299,130 B2 * | 11/2007 | Mulligan et al. | 701/13 |
| 7,418,317 B2 * | 8/2008 | Cosgrove et al. | 701/1 |
| 7,464,895 B2 | 12/2008 | Palmer | |
| 7,587,764 B2 * | 9/2009 | Cox | 726/23 |
| 2004/0044444 A1 * | 3/2004 | Johnson et al. | 701/3 |
| 2007/0095972 A1 * | 5/2007 | Buffenoir et al. | 244/15 |
| 2009/0026316 A1 * | 1/2009 | Miller | 244/123.1 |
| 2009/0032648 A1 | 2/2009 | Pearson | |
| 2009/0292407 A1 | 11/2009 | Minelli et al. | |

* cited by examiner

*Primary Examiner* — Mary Cheung  
*Assistant Examiner* — Daniel L Greene  
(74) *Attorney, Agent, or Firm* — Yee & Associates, P.C.

(57) ABSTRACT

A method and apparatus for managing solar power collection. A position of the sun is identified relative to an aerospace vehicle while the aerospace vehicle is moving along a flight path. A level of power generation is identified by a solar power generation system while the aerospace vehicle moves along the flight path using a threat management module and equivalent radar signature data. The threat management module uses the equivalent radar signature data to identify the level of power generation by the aerospace vehicle from different positions of the sun relative to the aerospace vehicle, and the equivalent radar signature data is based on solar power generation signature data identifying the level of power generation for the different positions of the sun relative to the aerospace vehicle. A change in the flight path that results in a desired level of power generation is identified by the solar power generation system.

20 Claims, 9 Drawing Sheets

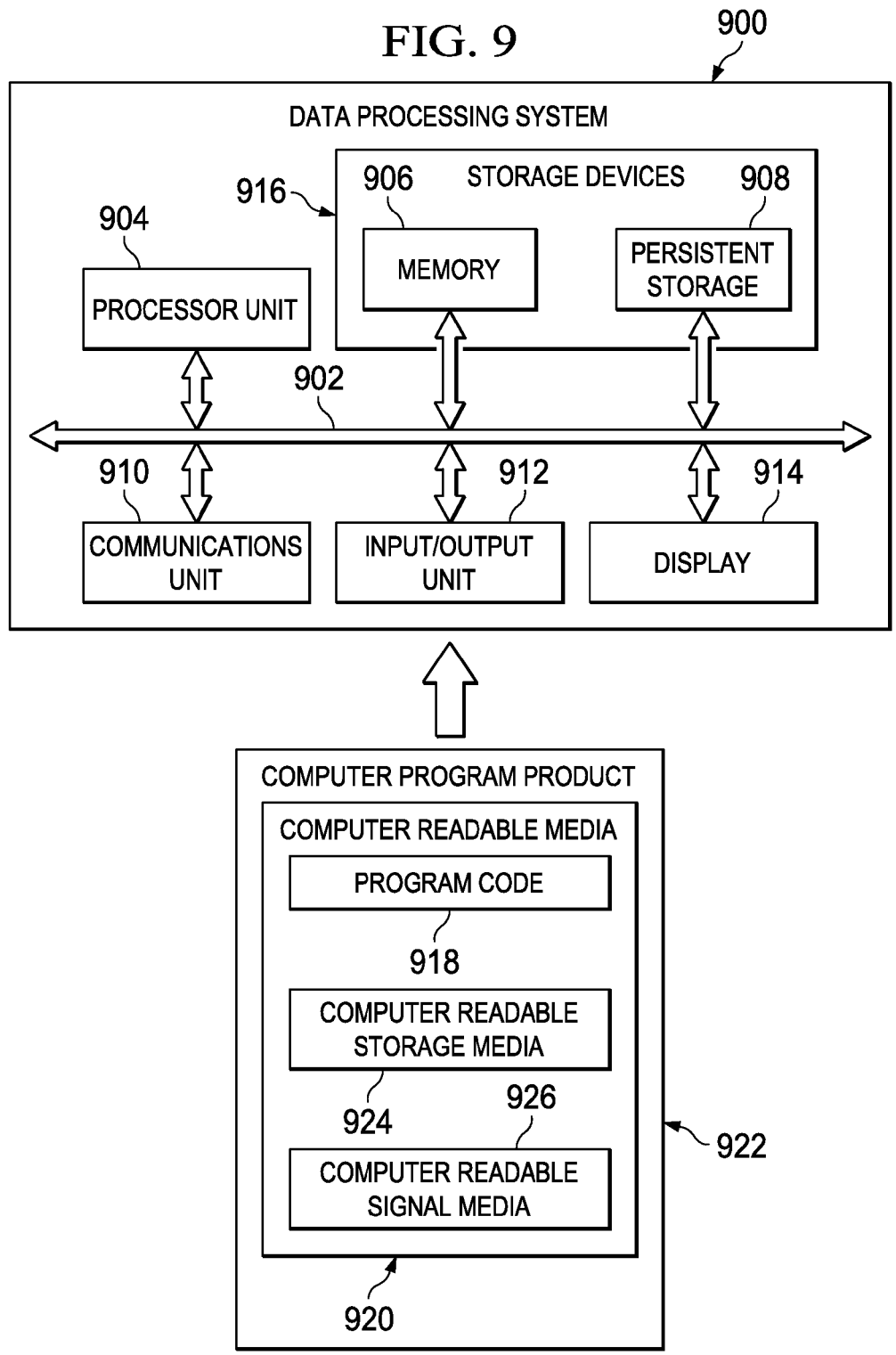

SOLAR ENERGY COLLECTION FLIGHT PATH MANAGEMENT SYSTEM FOR AIRCRAFT

BACKGROUND INFORMATION

1. Field

The present disclosure relates generally to solar powered aircraft and, in particular, to managing a flight path or trajectory of the aircraft. Still more particularly, the present disclosure relates to a method and apparatus for managing flight paths for aircraft in a manner that increases generation of power from solar power collection systems on the aircraft.

2. Background

Unmanned aerial system (UAS) aircraft are powered aerial vehicles that do not carry a human operator. This type of aircraft typically is powered and may fly under its own control or under the control of a remote pilot. This type of aircraft is also referred to as an unmanned aerial vehicle (UAV).

The unmanned aerial vehicle may take different forms. For example, the unmanned aerial vehicle may be in the form of an airplane, rotorcraft, and/or other suitable forms. An unmanned aerial vehicle may come in different sizes and may have different operating ranges and altitudes.

Unmanned aerial vehicles may be used for different types of missions. For example, unmanned aerial vehicles may be used to monitor areas, as well as deliver payloads to targets. For example, unmanned aerial vehicles may be used in military operations, fire fighting, security work, inspecting of pipelines, collecting data for maps, collecting data on weather conditions, and/or other suitable types of operations.

The design of unmanned aerial vehicles may vary, depending on the intended purpose of the aerial vehicles. In some cases, reducing a radar signature of an unmanned aerial vehicle may be desirable. The shape, materials, and other parameters of an unmanned aerial vehicle may be selected to reduce the likelihood that the unmanned aerial vehicle can be detected by a radar system.

In other operations, extending the endurance of flight before refueling may be needed. For example, some unmanned aerial vehicles (UAVs) may fly at altitudes and distances that make retrieving and/or refueling the unmanned aerial vehicle for maintenance more difficult than desired to perform at its regular intervals.

When one unmanned aerial vehicle is to be retrieved for maintenance or does not have the fuel needed to continue a mission, another unmanned aerial vehicle may be sent up prior to the first one being unable to perform operations. This situation may result in higher costs and more coordination of unmanned aerial vehicles than desired.

One solution involves using unmanned aerial vehicles with solar powered generation systems. The solar powered generation system generates a current that may be used to power electric engines or charge a battery on the solar powered UAV. This battery may then provide power to devices in the aircraft for performing different operations.

With these types of solar power generation systems, the unmanned aerial vehicle may be designed to have a placement of solar cells that provide a desired level of power generation for the unmanned aerial vehicle. Even with these systems, maneuvering the aircraft, weather, and other environmental conditions may result in the solar power generation system generating less power than desired.

Therefore, it would be advantageous to have a method and apparatus that takes into account at least one of the issues discussed above, as well as possibly other issues.

SUMMARY

In one advantageous embodiment, a method for managing solar power collection is provided. A position of the sun is identified relative to an aerospace vehicle while the aerospace vehicle is moving along a flight path. A level of power generation is identified by a solar power generation system while the aerospace vehicle moves along the flight path using a threat management module and equivalent radar signature data. The threat management module uses the equivalent radar signature data to identify the level of power generation by the aerospace vehicle from different positions of the sun relative to the aerospace vehicle. The equivalent radar signature data is based on solar power generation signature data identifying the level of power generation for the different positions of the sun relative to the aerospace vehicle. A change in the flight path that results in a desired level of power generation is identified by the solar power generation system.

In another advantageous embodiment, an apparatus comprises a flight management system. The flight management system is configured to identify a position of the sun relative to an aerospace vehicle while the aerospace vehicle is moving along a flight path. The flight management system is further configured to identify a level of power generation by a solar power generation system while the aerospace vehicle moves along the flight path using a threat management module and equivalent radar signature data. The threat management module uses the equivalent radar signature data to identify the level of power generation by the aerospace vehicle from different positions of the sun relative to the aerospace vehicle and the equivalent radar signature data is based on solar power generation signature data identifying the level of power generation for the different positions of the sun relative to the aerospace vehicle. The flight management system is further configured to identify a change in the flight path that results in a desired level of power generation by the solar power generation system.

In yet another advantageous embodiment, a computer program product comprises a computer readable storage media, first program code, second program code, and third program code. The first program code is for identifying a position of a sun relative to an aerospace vehicle while the aerospace vehicle is moving along a flight path. The second program code is for identifying a level of power generation by a solar power generation system while the aerospace vehicle moves along the flight path using a threat management module and equivalent radar signature data. The threat management module uses the equivalent radar signature data to identify the level of power generation by the aerospace vehicle from different positions of the sun relative to the aerospace vehicle. The equivalent radar signature data is based on solar power generation signature data identifying the level of power generation for the different positions of the sun relative to the aerospace vehicle. The third program code is for identifying a change in the flight path that results in a desired level of power generation by the solar power generation system. The first program code, the second program code, and the third program code are stored on the computer readable storage media.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the disclosure are set forth in the appended claims. The disclosure itself, however, as well as a preferred mode of use, further objectives, and advantages thereof, will best be understood by reference to the following detailed description of an advantageous embodiment of the present disclosure when read in conjunction with the accompanying drawings, wherein:

FIG. 9 is an illustration of a data processing system in accordance with an advantageous embodiment.

DETAILED DESCRIPTION

Figure 1:
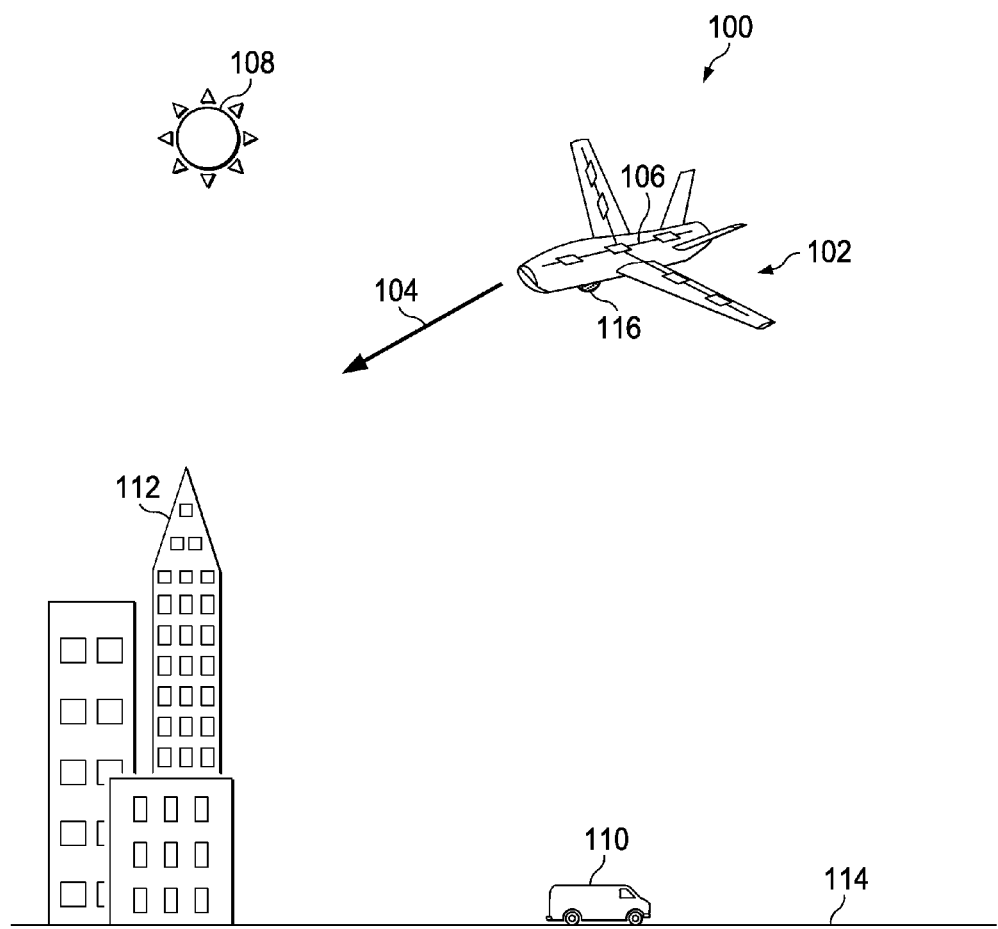
FIG. 1 is an illustration of a flight environment in accordance with an advantageous embodiment.

With reference now to the figures and, in particular, with reference to FIG. 1, an illustration of a flight environment is depicted in accordance with an advantageous embodiment. In this illustrative example, flight environment 100 is an example of an environment in which an advantageous embodiment may be implemented. In this depicted example, aircraft 102 flies along flight path 104. Aircraft 102 is an unmanned aerial system aircraft in these examples. Aircraft 102 includes solar power generation system 106. Solar power generation system 106 generates power for aircraft 102 from exposure to sunlight generated by sun 108. The power generated by solar power generation system 106 may be used directly by different devices in aircraft 102 and/or may be stored in a storage system, such as a battery, for later use.

In these illustrative examples, aircraft 102 may perform a mission, such as observation of vehicle 110, building 112, or both on ground 114. Observing of vehicle 110 and building 112 may include generating information about these objects using sensor system 116. In these illustrative examples, sensor system 116 may be, for example, without limitation, a visible light camera, an infrared camera, a laser range finder, and/or other suitable types of sensors. Of course, aircraft 102 may perform other missions, such as, for example, delivering payloads.

With solar power generation system 106, the amount of time of the distance that the aircraft may fly to perform a mission may be increased through having solar power generation system 106 generate power at a desired level to operate aircraft 102. One or more of the advantageous embodiments may be implemented in aircraft 102 to manage flight path 104 in a manner that provides exposure of solar power generation system 106 to sun 108 such that solar power generation system 106 generates power at a desired level for aircraft 102.

The advantageous embodiments recognize and take into account one or more considerations in managing the generation of power in aircraft 102 using solar power generation system 106. For example, the different advantageous embodiments recognize and take into account that for different azimuths and different elevations of sun 108 relative to aircraft 102, different amounts of power may be generated by solar power generation system 106.

The different advantageous embodiments recognize and take into account that this information may be in the form of solar power signature data that identifies the amount of solar power generation that occurs in solar power generation system 106 based on the position of sun 108 relative to aircraft 102.

Additionally, the different advantageous embodiments recognize and take into account that the amount of power generated by solar power generation system 106 may be less than desirable when sun 108 is at particular elevations with respect to aircraft 102. In these illustrative examples, these elevations are lower elevation angles that may occur at times that do not allow for as much power to be generated by solar power generation system 106 as desired. The lower angle may occur, such as, for example, during a sunrise in a winter solstice.

The different advantageous embodiments recognize and take into account that processes for managing the amount of power generated by solar power generation system 106 may be managed through management of flight path 104. Flight path 104 of aircraft 102 in FIG. 1 may be managed to cause solar power generation system 106 to generate solar power at a desired level for aircraft 102.

Generating software, hardware, or a combination of the two to perform these processes may require more time and expense than desired. The different advantageous embodiments recognize and take into account that in avoiding threats, radar signature data may be identified for an aircraft. A process may use this radar signature data to manage the flight path of an aircraft to reduce the detectability of the aircraft to sensor systems, such as radar systems.

The different advantageous embodiments recognize and take into account that the existing systems for reducing detectability of aircraft to sensors may be used with solar power signature data. The different advantageous embodiments recognize and take into account that by being able to use existing systems with minor or no modifications, the time and expense needed to design and manufacture a system to manage solar power generation in aircraft may be reduced.

Thus, the different advantageous embodiments provide a method and apparatus for managing solar power collection by an aircraft. An aircraft having a solar power generation system is moved on a flight path. A level of power generation by the solar power generation system is identified, while the aircraft moves along the flight path. This level of power generation is performed using a threat management module. The threat management module uses radar signature data identifying detectability of the aircraft in different positions relative to the aircraft. The position of the sun relative to the aircraft, and radar data signature based on solar power generation signature data identifying levels of solar power generation for different positions of the sun relative to the aircraft converted into equivalent radar signature data is present. A change of the flight path is identified. This results in a desired level of power generation by the solar power generation system.

Figure 2:
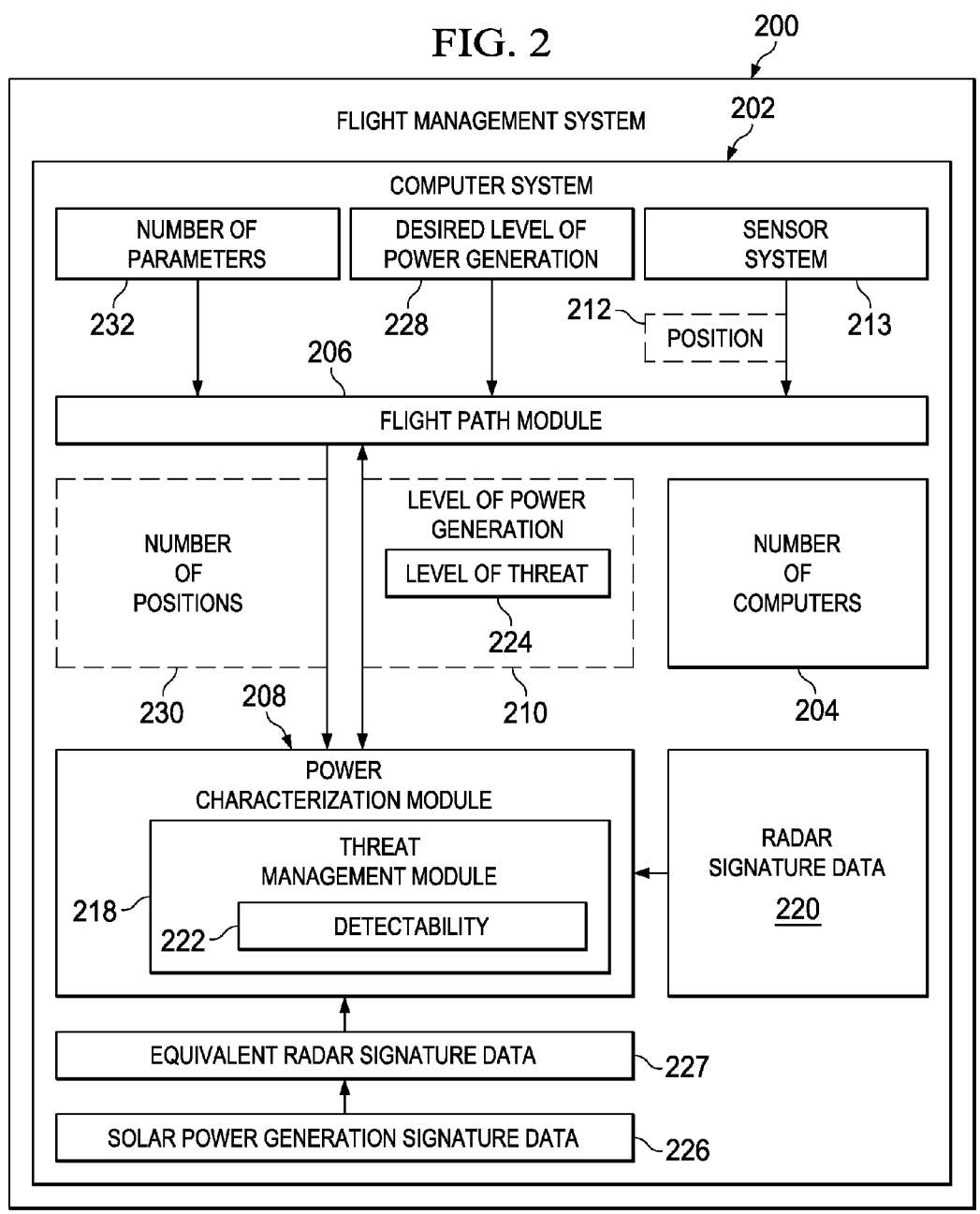
FIG. 2 is an illustration of a flight management system in accordance with an advantageous embodiment.

With reference now to FIG. 2, an illustration of a flight management system is depicted in accordance with an advantageous embodiment. Flight management system 200 may be used to manage flight path 104 of aircraft 102 in FIG. 1 in these illustrative examples.

Flight management system 200 comprises computer system 202. Computer system 202 is number of computers 204. "A number", as used herein with reference to items, means one or more items. For example, "number of computers 204" is one or more computers. When more than one computer is present in computer system 202, those computers may be in communication with each other in these illustrative examples.

Flight path module 206 is located in computer system 202 in this illustrative example. Flight path module 206 may be implemented using hardware, software, or a combination of the two.

In these illustrative examples, flight path module 206 is configured to control the movement of aircraft 102 along flight path 104. Flight path module 206 may receive input from power characterization module 208. In these examples, power characterization module 208 provides level of power generation 210 based on position 212 of sun 108 relative to aircraft 102 in FIG. 1. In these illustrative examples, position 212 is about the position of sun 108 relative to aircraft 102. In these illustrative examples, position 212 is identified by sensor system 213. Position 212 for sun 108 relative to aircraft 102 may be identified in a number of different ways. For example, the position of sun 108 may be identified in a table or database that has positions of sun 108 for different times of the day based on the day of the year.

In these illustrative examples, position 212 may take the form of an angle, coordinates, a vector, and/or other suitable forms of expressing positions of one object relative to another object. Position 212 may be, for example, expressed using an elevation angle and an azimuth angle. These angles describe position 212 of sun 108 relative to aircraft 102 in these illustrative examples.

In these illustrative examples, power characterization module 208 may be implemented using threat management module 218. Threat management module 218 receives radar signature data 220 to identify detectability 222 of an aircraft. In these illustrative examples, detectability 222 may be identified as level of threat 224.

In these illustrative examples, solar power generation signature data 226 identifies the level of solar power generation for different positions of sun 108 relative to aircraft 102. Solar power generation signature data 226 may be modified for use with threat management module 218. In other words, radar signature data 220 may be a form of solar power generation signature data 226. Solar power generation signature data 226 is converted into equivalent radar signature data 227 for use by threat management module 218 in these illustrative examples. As a result, level of threat 224 generated by threat management module 218 represents level of power generation 210 in the illustrative examples.

Equivalent radar signature data 227 is not data about the detectability of aircraft 102. Instead, the conversion of solar power generation signature data 226 into equivalent radar signature data 227 allows for threat management module 218 to provide output that identifies level of power generation 210 even though threat management module 218 originally was designed to identify level of threat 224.

In other words, equivalent radar signature data 227 is data that may be used by threat management module 218 to generate output that is actually level of power generation 210. In other words, when level of threat 224 is lower, level of power generation 210 is higher. In this manner, threat management module 218 may have dual purposes.

In these illustrative examples, equivalent radar signature data 227 may be stored in computer system 202 for use by power characterization module 208. In other words, solar power generation signature data 226 may be converted into equivalent radar signature data 227 ahead of time and then stored in flight management system 200.

As position 212 of sun 108 is identified relative to aircraft 102, the data corresponding to position 212 in solar power generation signature data 226 may be converted into equivalent radar signature data 227 for use by power characterization module 208 when threat management module 218 is used to implement power characterization module 208. This type of conversion may be referred to as an "on the fly" conversion.

With level of power generation 210, flight path module 206 may change flight path 104 for aircraft 102 in a manner that results in desired level of power generation 228 by solar power generation system 106 in aircraft 102. In these illustrative examples, flight path module 206 may send number of positions 230 to power characterization module 208. In this illustrative example, number of positions 230 may be position 212 of sun 108.

In response, when threat management module 218 is used to implement power characterization module 208, threat management module 218 returns level of power generation 210 rather than an actual level of threat when using equivalent radar signature data 227 instead of radar signature data 220.

Flight path module 206 may use level of power generation 210 to determine whether level of power generation 210 meets desired level of power generation 228. Level of power generation 210 may meet desired level of power generation 228 if level of power generation 210 is equal to desired level power generation 228 or greater than desired level of power generation 228.

If level of power generation 210 for number of positions 230 does not meet desired level of power generation 228 when number of positions 230 is position 212, flight path module 206 may identify new values for number of positions 230. For example, number of positions 230 may be a range of positions relative to position 212 of sun 108. Number of positions 230 may then be sent to power characterization module 208.

Level of power generation 210, received in response to sending number of positions 230 to power characterization module 208, may take the form of one or more values with each value corresponding to a position in number of positions 230. These values for level of power generation 210 may be compared to desired level of power generation 228. The comparison is used to determine whether any of the values for level of power generation 210 meet desired level of power generation 228. Additional values for number of positions 230 may be sent if level of power generation 210 does not meet desired level of power generation 228. This process may continue until level of power generation 210 meets desired level of power generation 228 for number of positions 230.

When a position within number of positions 230 results in a value for level of power generation 210 that meets desired level of power generation 228, flight path module 206 may change flight path 104 for aircraft 102. Flight path 104 may be changed to change position 212 of sun 108 relative to aircraft 102 from the current position of sun 108 to a desired position for position 212 based on number of positions 230 that have level of power generation 210 that meet desired level of power generation 228.

In these illustrative examples, desired level of power generation 228 is an amount of power needed by aircraft 102. Desired level of power generation 228 may be based on different factors. For example, the amount of power currently being used by devices in aircraft 102 is one factor. Another factor may also take into account the amount of stored power, such as power stored in batteries.

In these illustrative examples, flight path module 206 also may take into account number of parameters 232. Number of parameters 232 may include, for example, without limitation, at least one of a mission parameter, an area of observation, a predefined boundary, a target location, a range of altitudes, weather, wind, clouds, and/or other suitable types of parameters.

As used herein, the phrase "at least one of", when used with a list of items, means different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C.

A mission parameter may be, for example, a constraint as to regions in which aircraft 102 may travel or a range of altitudes at which aircraft 102 flies. Another example of a mission parameter may be a requirement that aircraft 102 positions sensors to obtain information about target objects.

As a result, level of power generation 210 may not always meet desired level of power generation 228, depending on number of parameters 232. However, the different advantageous embodiments optimize or increase level of power generation 210 as much as possible when number of parameters 232 is also taken into account.

Thus, with one or more advantageous embodiments, level of power generation 210 may be maintained at or above desired level of power generation 228 in these illustrative examples. This management of power generation by solar power generation system 106 is performed through managing flight path 104 for aircraft 102. In these illustrative examples, the identification of level of power generation 210 is performed using threat management module 218.

By using a component that has a current use, the number of components that may need to be designed and/or manufactured for aircraft may be reduced. For example, a component designed for reducing detectability in an unmanned aerial vehicle also may be used to manage power generation of solar power generation systems. As a result, the designing, upgrading, improving, or making other changes to modules may be reduced in cost and time. This reduction may occur, because the same module may be substantially used for both reducing detectability of an aircraft and managing power generation by solar power generation systems for an aircraft.

The illustration of flight management system 200 in FIG. 2 is not meant to imply physical or architectural limitations to the manner in which an advantageous embodiment may be implemented. Other components in addition to and/or in place of the ones illustrated may be used. Some components may be unnecessary. Also, the blocks are presented to illustrate some functional components. One or more of these blocks may be combined and/or divided into different blocks when implemented in an advantageous embodiment.

For example, although flight path module 206 and power characterization module 208 are illustrated as being in computer system 202 on aircraft 102, these components may be in other locations, depending on the particular implementation. For example, flight path module 206, power characterization module 208, or both may be located at a remote location, such as a ground station or another aircraft, depending on the particular implementation.

When these modules are not present in aircraft 102, flight path information may be sent to a controller or flight path computer in aircraft 102. This flight path computer causes aircraft 102 to fly along flight path 104 as defined by flight path module 206 that is in another location.

As another example, a communications unit may be present to send and receive information between computer system 202 and another location. Further, although the different illustrative examples have described aircraft 102 as an unmanned aerial vehicle, aircraft 102 may take other forms. For example, aircraft 102 may be a manned aircraft or an aircraft with passengers, depending on the particular implementation. As another example, one or more different advantageous embodiments may be applied to other types of vehicles. For example, flight management system 200 may be implemented for use with other types of aerospace vehicles in addition to aircraft 102. For example, without limitation, flight management system 200 also may be implemented for use in aerospace vehicles in the form of spacecraft.

Figure 3:
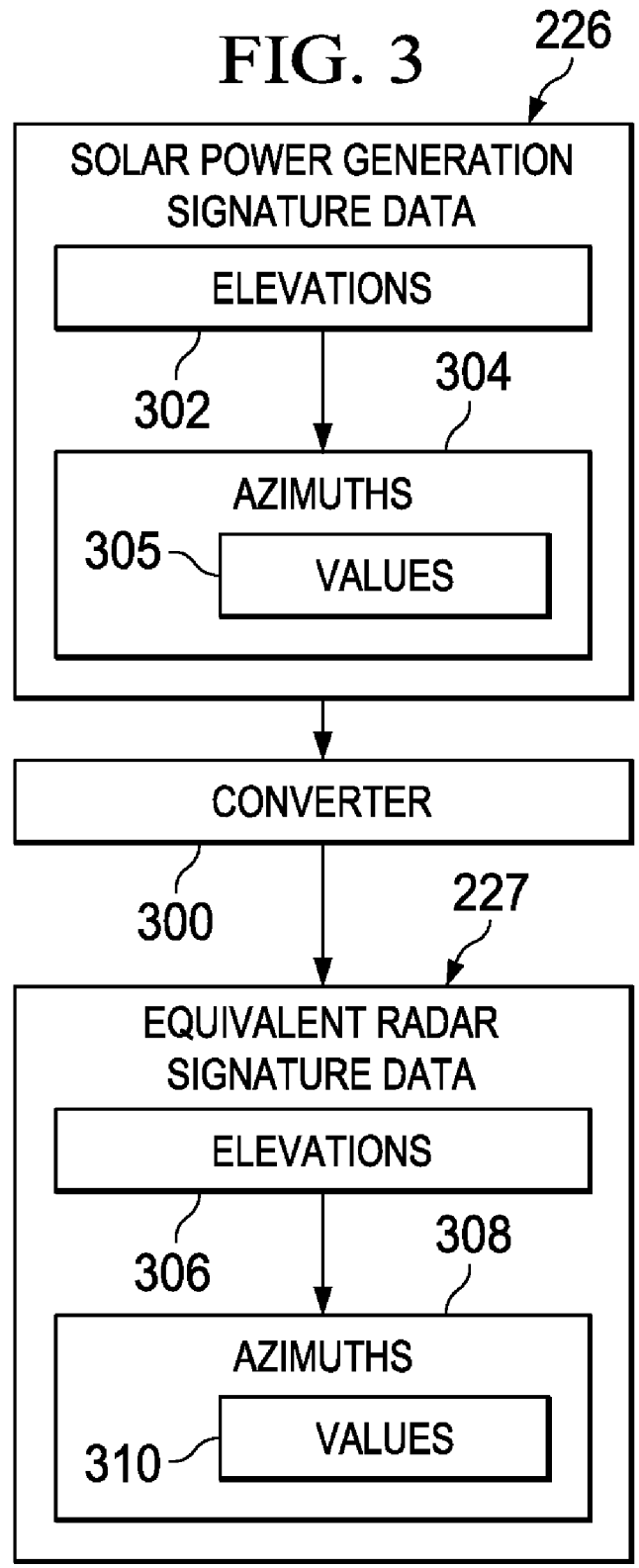
FIG. 3 is an illustration of a conversion of solar power generation signature data into radar signature data in accordance with an advantageous embodiment.

Turning next to FIG. 3, an illustration of a conversion of solar power generation signature data into equivalent radar signature data is depicted in accordance with an advantageous embodiment. In this illustrative example, solar power generation signature data 226 is converted into equivalent radar signature data 227 using converter 300. Converter 300 may be hardware, software, or both within computer system 202 located in flight management system 200 in FIG. 2, another computer system, or some other component that is configured to convert solar power generation signature data 226 into equivalent radar signature data 227.

As illustrated, solar power generation signature data 226 is organized as elevations 302 and azimuths 304. Values 305 are present for each azimuth in azimuths 304. Each elevation in elevations 302 has multiple azimuths in azimuths 304. Each azimuth in azimuths 304 has a value in values 305 for a corresponding elevation in elevations 302.

In these illustrative examples, elevations 302 and azimuths 304 are identified by degrees. The values for power generation in these examples are normalized. The normalization is one for the maximum amount of power generation.

Equivalent radar signature data 227 has elevations 306 and azimuths 308. Each elevation in elevations 306 has multiple azimuths in azimuths 308. Each azimuth in azimuths 308 has a value in values 310. For each azimuth corresponding to a particular elevation, a value in values 310 is present for the detectability of the aircraft.

In these illustrative examples, converter 300 processes each value for power generation in solar power generation signature data 226 using the following:

$$ERSV = \frac{1}{SPSV}$$

where ERSV is the equivalent radar signature value, and SPSV is the solar power signature value. As depicted, converter 300 converts a value in values 305 into a value in values 310 in these illustrative examples.

Figure 4:
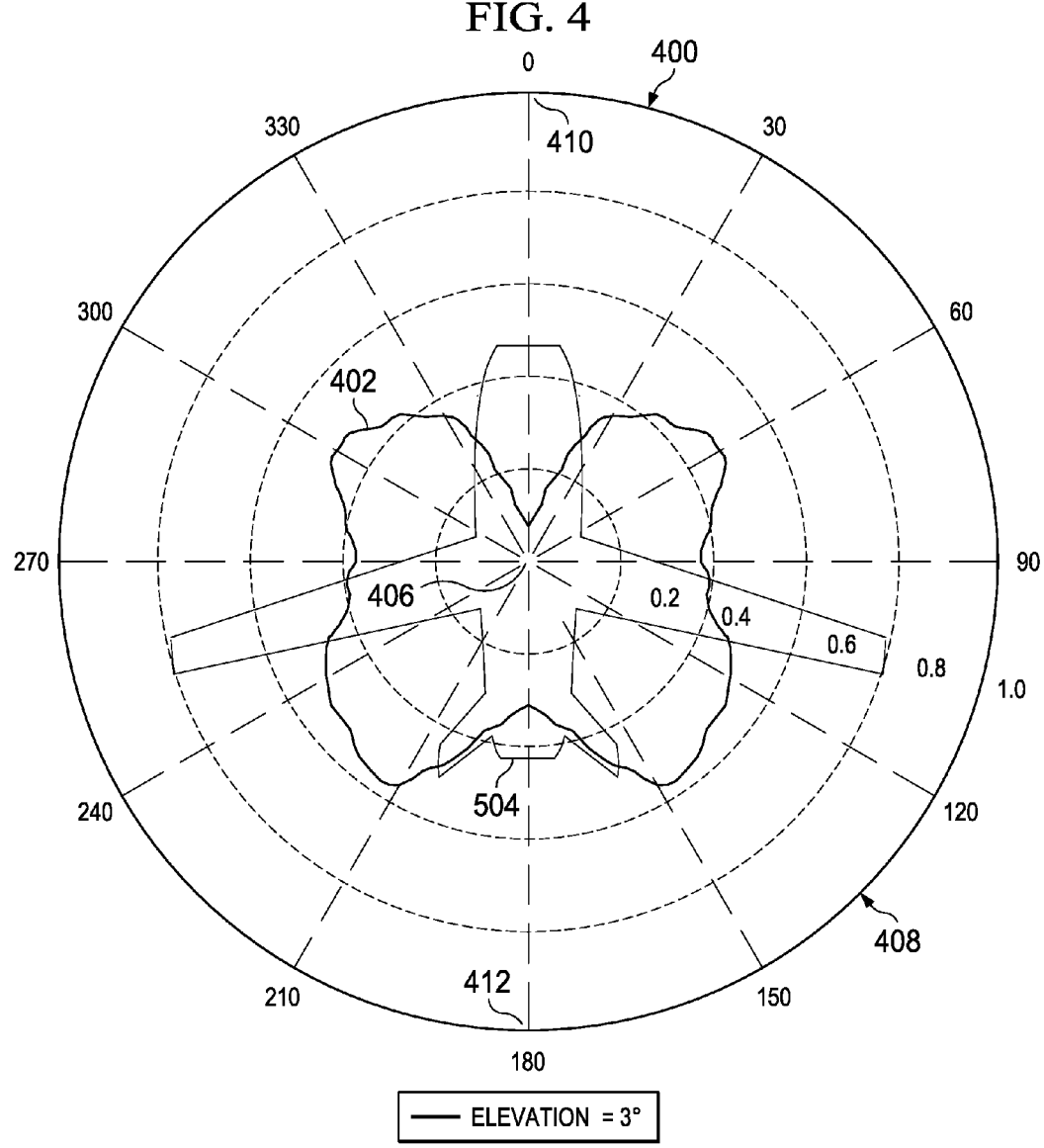
FIG. 4 is an illustration of solar power generation signature data in accordance with an advantageous embodiment.

With reference now to FIG. 4, an illustration of solar power generation signature data is depicted in accordance with an advantageous embodiment. In this illustrative example, power response plot 400 is an example of a portion of solar power generation signature data 226.

Power response plot 400 is an example of a portion of the values in azimuths 304 for a particular elevation in elevations 302 in solar power generation signature data 226 in FIG. 3.

Power response plot 400 is a plot of levels of power generation when sun 108 is at about three degrees elevation with respect to aircraft 102 in FIG. 1. In this illustrative example, power response plot 400 uses a polar coordinate system from about zero to about 360 degrees. Icon 404 is a representation of a top view of aircraft 102 in this illustrative example. Center 406 represents a value of about zero, while edge 408 represents a value of about one in these illustrative examples.

Line 402 represents power generated by solar power generation system 106 for aircraft 102 in FIG. 1.

The different degrees in power response plot 400 represents positions around aircraft 102 for a sun elevation of about three degrees in this example. These positions are for the position of sun 108 relative to aircraft 102.

For example, point 410 represents zero degrees. In this example, zero degrees are when sun 108 is in front of aircraft 102. Point 412 represents 180 degrees. Point 412 represents a position of sun 108 behind aircraft 102.

As the value of a point on line 402 increases, the amount of power generated by solar power generation system 106 increases. In this manner, different values for level of power generation 210 may be identified for different positions of sun 108 relative to aircraft 102.

Figure 5:
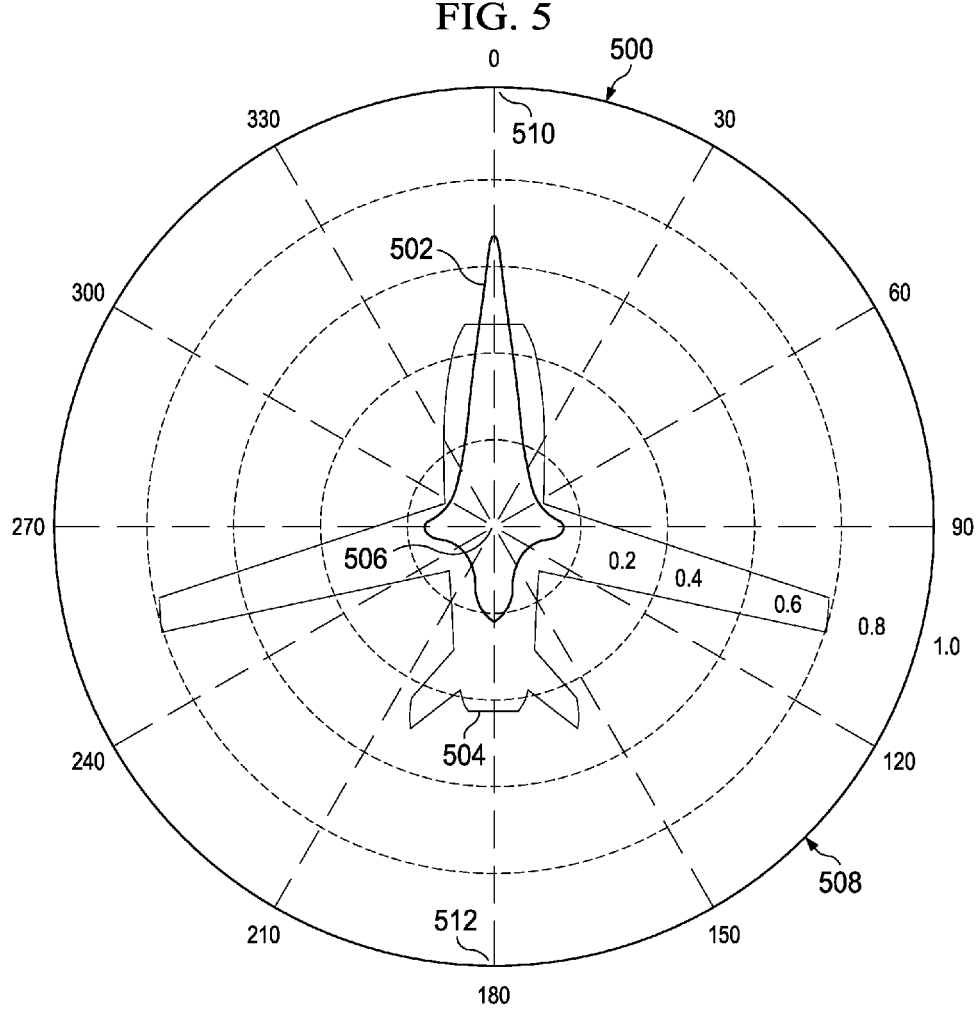
FIG. 5 is an illustration of equivalent radar signature data in accordance with an advantageous embodiment.

Turning now to FIG. 5, an illustration of equivalent radar signature data generated from converting solar power generation signature data is depicted in accordance with an advantageous embodiment.

In this illustrative example, equivalent radar response plot 500 is an example of a portion of data in equivalent radar signature data 227. In this illustrative example, equivalent radar response plot 500 also is depicted using a polar coordinate system. Equivalent radar response plot 500 is an example of a display of a portion of values in azimuths 308 for a particular elevation in elevations 306 in equivalent radar signature data 227 in FIG. 3.

Line 502 represents a response of an aircraft to a sensor system, such as a radar system. Icon 504 represents an aircraft. In this illustrative example, icon 504 represents aircraft 102 in FIG. 1. In this illustrative example, center 506 represents a value of zero, while edge 508 represents a value of one in these examples.

In this illustrative example, equivalent radar response plot 500 also has about three degrees elevation in which the elevation is with respect to a threat. Point 510 represents zero degrees and is a position of a threat in front of an aircraft. Point 512 is about 180 degrees and represents a position of a threat located behind the aircraft.

However, line 502 does not actually represent the signature of aircraft 102 with respect to detectability by a radar system or other sensor system. Instead, line 502 is generated using line 402 in FIG. 4. Each point in line 402 is inverted in points to generate line 502.

Thus, equivalent radar signature data 227 in equivalent radar response plot 500 is a plot of radar responses for a plurality of azimuths for a particular elevation in which the radar responses are for responses of power generation for the plurality of azimuths at that particular elevation.

In this manner, equivalent radar response plot 500 may be used by threat management module 218 to identify level of threat 224 in FIG. 2. When level of threat 224 is lower, level of power generation 210 is greater.

In this manner, equivalent radar response plot 500 may be used by flight path module 206 to change flight path 104 of aircraft 102 to reach desired level of power generation 228. This may be accomplished without designing an entirely new module for use to manage power generation by solar power generation system 106. In this manner, a module, such as threat management module 218, may be used for dual purposes.

Figure 6:
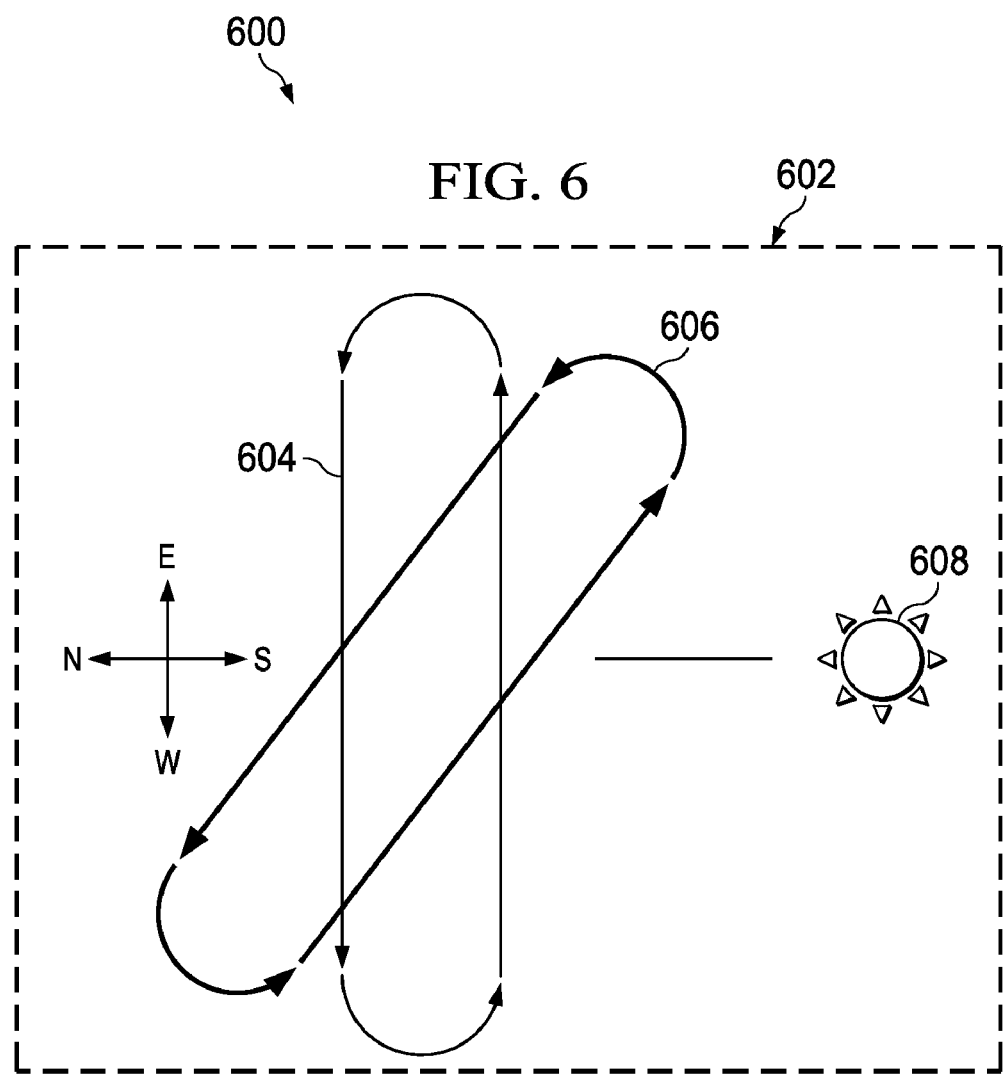
FIG. 6 is an illustration of a change in flight path in accordance with an advantageous embodiment.

With reference now to FIG. 6, an illustration of a change in flight path is depicted in accordance with an advantageous embodiment. In this illustrative example, aircraft 102 in FIG. 1 may fly within area 600 as defined by boundary 602. Flight path 604 is a flight path selected for aircraft 102 to perform a mission.

Changes may be made in flight path 604 by maintaining the general shape of flight path 604 within area 600. The change in flight path 604 may be made by flight management system 200 in aircraft 102. These changes may be made to obtain desired level of power generation 228 in FIG. 2 for aircraft 102.

In this illustrative example, when sun 608 is at noon, the position of sun 608 relative to aircraft 102 may be used to change flight path 604 to flight path 606. This change of flight path 604 to flight path 606 may provide desired level of power generation 228 for aircraft 102. The change of flight path 604 to flight path 606 is performed using plots, such as equivalent radar response plot 500 with sun 608 being the threat for which aircraft 102 is to navigate around.

The illustration of power response plot 400 in FIG. 4 and equivalent radar response plot 500 in FIG. 5 are only illustrative examples of how solar power generation signature data 226 and equivalent radar signature data 227 may be displayed. Further, these plots only illustrate level of power generation 210 and detectability 222 of aircraft 102 for an elevation of about three degrees. Other plots may be present for other elevations with respect to the different azimuths around aircraft 102.

Thus, equivalent radar signature data 227 are plots of radar responses for a plurality of azimuths and elevations in which the radar responses are from responses of power generation for the plurality of azimuths and elevations. Although one use of the output is to identify detectability of aircraft 102 in the form of level of threat 224 when radar signature data 220 is used by threat management module 218, the output also may be used to identify level of power generation 210. This use of the output may occur when solar power generation signature data 226 is converted into equivalent radar signature data 227 for use by threat management module 218 instead of using radar signature data 220.

Figure 7:
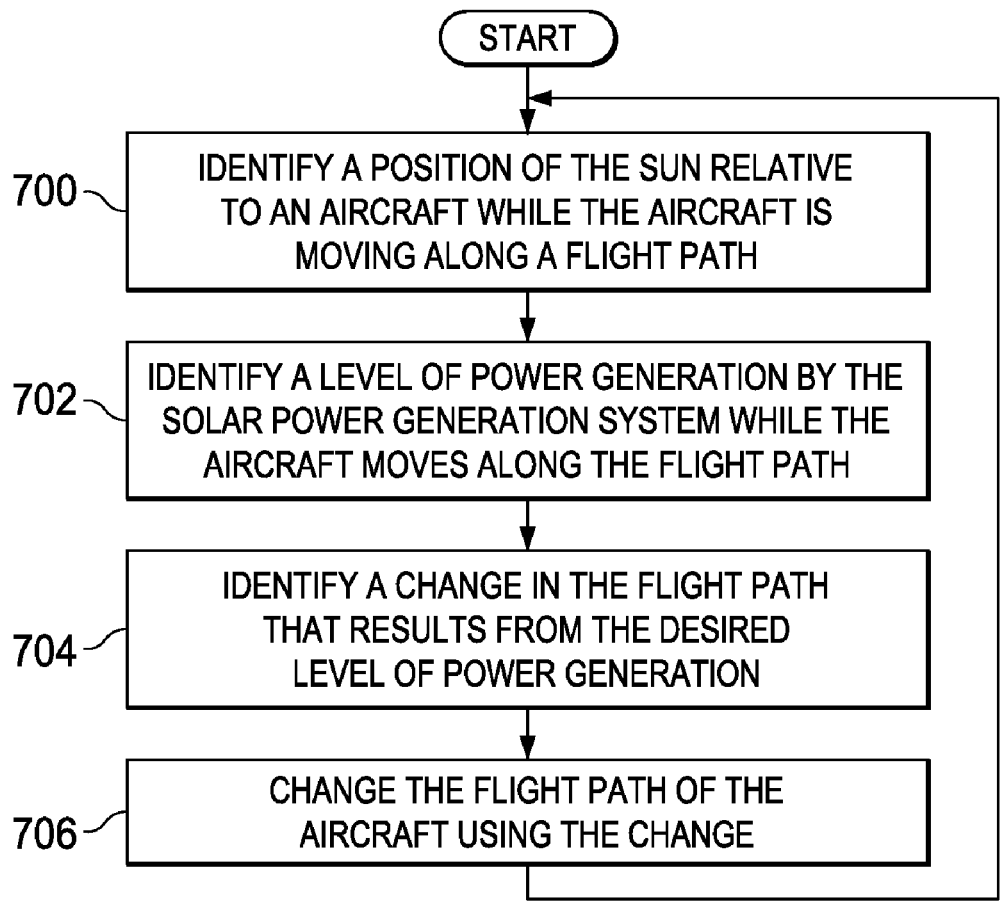
FIG. 7 is an illustration of a flowchart of a process for managing solar power collection in accordance with an advantageous embodiment.

With reference now to FIG. 7, an illustration of a flowchart of a process for managing solar power collection is depicted in accordance with an advantageous embodiment. The process illustrated in FIG. 7 may be implemented in flight management system 200 in FIG. 2. In particular, this process may be implemented using flight path module 206 and/or power characterization module 208.

The process begins by identifying a position of the sun relative to an aircraft while the aircraft is moving along a flight path (operation 700). The process then identifies a level of power generation by the solar power generation system while the aircraft moves along the flight path (operation 702).

Operation 702 is performed using a threat management module in equivalent radar signature data. The threat management module uses the equivalent radar signature data identifying detectability of the aircraft in different positions of the sun relative to the aircraft. The equivalent radar signature data is based on solar power generation signature data identifying the levels of solar power generation for different positions of the sun relative to the aircraft that has been converted into the equivalent radar signature data.

The process then identifies a change in the flight path that results from the desired level of power generation (operation 704). The process then changes the flight path of the aircraft using the change (operation 706). The process then returns to operation 700.

Figure 8:
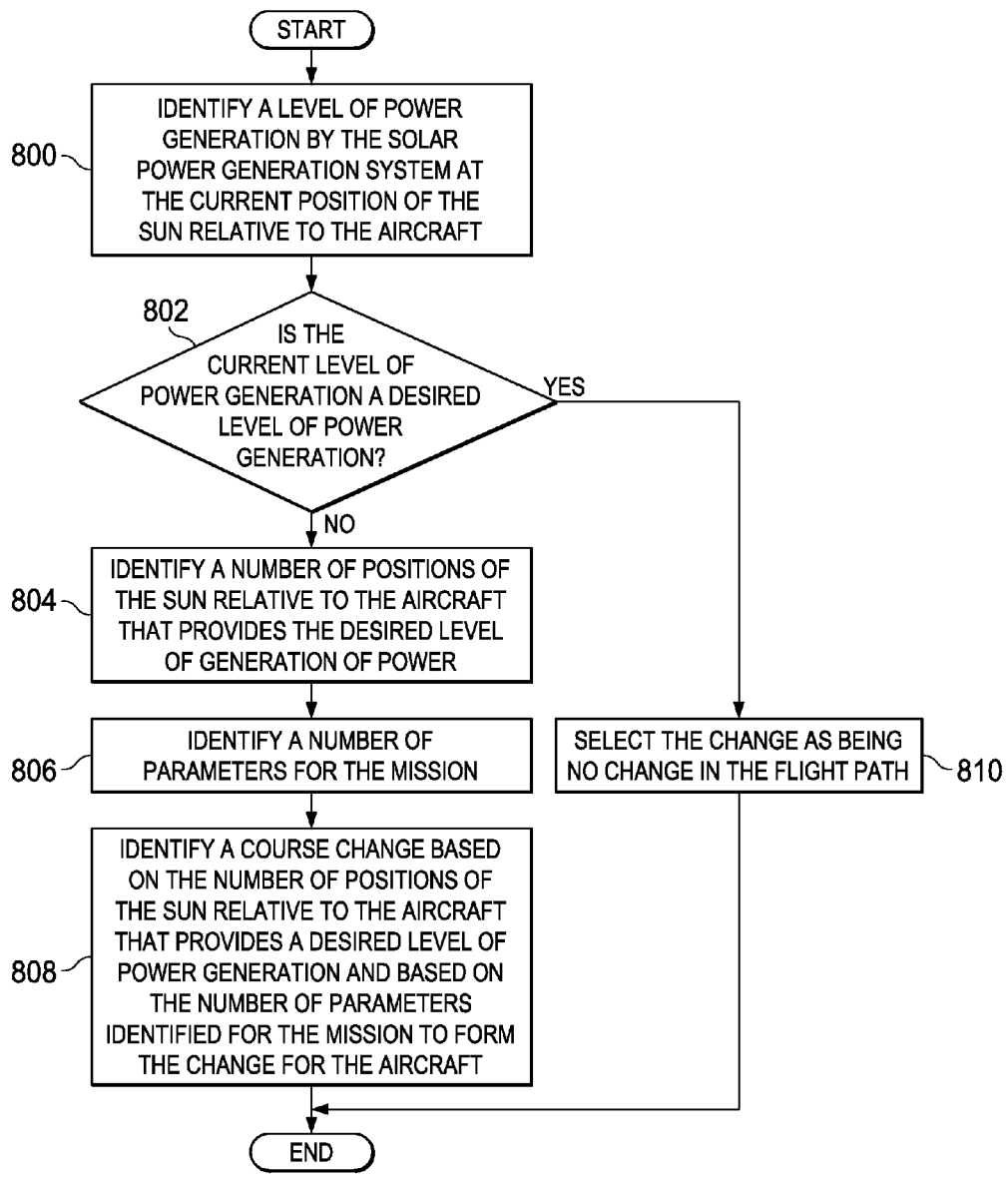
FIG. 8 is an illustration of a flowchart of a process for identifying a change in the flight path in accordance with an advantageous embodiment.

With reference now to FIG. 8, an illustration of a flowchart of a process for identifying a change in the flight path is depicted in accordance with an advantageous embodiment. The process illustrated in FIG. 8 may be implemented in flight management system 200 in FIG. 2. In particular, the process may be implemented in flight path module 206 in flight management system 200. The different operations in FIG. 8 may be an example of an implementation for operation 704 in FIG. 7.

The process identifies a level of power generation by the solar power generation system at the current position of the sun relative to the aircraft (operation 800). The level of power generation for the current position may be received from the results of operation 702 in FIG. 7. The process then determines whether the current level of power generation is a desired level of power generation (operation 802).

If the level of power generation is not a desired level of power generation, the process then identifies a number of positions of the sun relative to the aircraft that provides the desired level of generation of power (operation 804). The identification of the different levels of power generation for different positions of the sun relative to the aircraft may be performed using power characterization module 208 in FIG. 2.

The process then identifies a number of parameters for the mission (operation 806). The process then identifies a course change based on the number of positions of the sun relative to the aircraft that provides a desired level of power generation and based on the number of parameters identified for the mission to form the change for the aircraft (operation 808), with the process terminating thereafter.

The amount of course change based on the number of parameters for the mission and the current level of power generation may be made using one or more different rules. These rules may provide weights or factors to take into account the different number of parameters for the mission and the number of desired positions of the sun relative to the aircraft that provides a desired level of power generation.

With reference again to operation 802, if the level of power generation is within the level of desired power generation, the process selects the change as being no change in the flight path (operation 810), with the process terminating thereafter.

The flowcharts and block diagrams in the different depicted embodiments illustrate the architecture, functionality, and operation of some possible implementations of apparatus, methods, and computer program products. In this regard, each block in the flowcharts or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The process illustrated may be implemented in components, such as computer system 202, flight path module 206, power characterization module 208, and/or other modules or components for flight management system 200. In these illustrative examples, the process can be implemented in software, hardware, or a combination of the two. When software is used, the operations performed by the processes may be implemented in the program code configured to be run on a processor unit. When hardware is employed, the hardware may include circuits that operate to perform the operations in the processes illustrated.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices.

For example, in some cases, the change in course may not need to take into account parameters for a mission. As another illustrative example, operation 802 may identify azimuths and/or elevations within a range of the current azimuth and/or elevation of the sun with respect to the aircraft. This identification may be made in addition to and/or in place of identifying desired positions of the sun relative to aircraft.

Turning now to FIG. 9, an illustration of a data processing system is depicted in accordance with an advantageous embodiment. In this illustrative example, data processing system 900 includes communications framework 902, which provides communications between processor unit 904, memory 906, persistent storage 908, communications unit 910, input/output (I/O) unit 912, and display 914. Data processing system 900 may be used to implement one or more computers in number of computers 204 in computer system 202 for flight management system 200 in FIG. 2.

Processor unit 904 serves to execute instructions for software that may be loaded into memory 906. Processor unit 904 may be a number of processors, a multi-processor core, or some other type of processor, depending on the particular implementation. A number, as used herein with reference to an item, means one or more items. Further, processor unit 904 may be implemented using a number of heterogeneous processor systems in which a main processor is present with secondary processors on a single chip. As another illustrative example, processor unit 904 may be a symmetric multi-processor system containing multiple processors of the same type.

Memory 906 and persistent storage 908 are examples of storage devices 916. A storage device is any piece of hardware that is capable of storing information, such as, for example, without limitation, data, program code in functional form, and/or other suitable information either on a temporary basis and/or a permanent basis. Storage devices 916 may also be referred to as computer readable storage devices in these examples. Memory 906, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908.

Communications unit 910, in these examples, provides for communications with other data processing systems or devices. In these examples, communications unit 910 is a network interface card. Communications unit 910 may provide communications through the use of either or both physical and wireless communications links.

Input/output unit 912 allows for input and output of data with other devices that may be connected to data processing system 900. For example, input/output unit 912 may provide a connection for user input through a keyboard, a mouse, and/or some other suitable input device. Further, input/output unit 912 may send output to a printer. Display 914 provides a mechanism to display information to a user.

Instructions for the operating system, applications, and/or programs may be located in storage devices 916, which are in communication with processor unit 904 through communications framework 902. In these illustrative examples, the instructions are in a functional form on persistent storage 908. These instructions may be loaded into memory 906 for execution by processor unit 904. The processes of the different embodiments may be performed by processor unit 904 using computer-implemented instructions, which may be located in a memory, such as memory 906.

These instructions are referred to as program code, computer usable program code, or computer readable program code that may be read and executed by a processor in processor unit 904. The program code in the different embodiments may be embodied on different physical or computer readable storage media, such as memory 906 or persistent storage 908.

Program code 918 is located in a functional form on computer readable media 920 that is selectively removable and may be loaded onto or transferred to data processing system 900 for execution by processor unit 904. Program code 918 and computer readable media 920 form computer program product 922 in these examples. In one example, computer readable media 920 may be computer readable storage media 924 or computer readable signal media 926. Computer readable storage media 924 may include, for example, an optical or magnetic disk that is inserted or placed into a drive or other device that is part of persistent storage 908 for transfer onto a storage device, such as a hard drive, that is part of persistent storage 908. Computer readable storage media 924 also may take the form of a persistent storage, such as a hard drive, a thumb drive, or a flash memory, that is connected to data processing system 900.

In some instances, computer readable storage media 924 may not be removable from data processing system 900. In these examples, computer readable storage media 924 is a physical or tangible storage device used to store program code 918 rather than a medium that propagates or transmits program code 918. Computer readable storage media 924 is also referred to as a computer readable tangible storage device or a computer readable physical storage device. In other words, computer readable storage media 924 is a media that can be touched by a person.

Alternatively, program code 918 may be transferred to data processing system 900 using computer readable signal media 926. Computer readable signal media 926 may be, for example, a propagated data signal containing program code 918. For example, computer readable signal media 926 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 918 may be downloaded over a network to persistent storage 908 from another device or data processing system through computer readable signal media 926 for use within data processing system 900. For instance, program code stored in a computer readable storage medium in a server data processing system may be downloaded over a network from the server to data processing system 900. The data processing system providing program code 918 may be a server computer, a client computer, or some other device capable of storing and transmitting program code 918.

The different components illustrated for data processing system 900 are not meant to provide architectural limitations to the manner in which different embodiments may be implemented. The different advantageous embodiments may be implemented in a data processing system including components in addition to or in place of those illustrated for data processing system 900. Other components shown in FIG. 9 can be varied from the illustrative examples shown.

The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 904 may take the form of a hardware unit that has circuits that are manufactured or configured for a particular use. This type of hardware may perform operations without needing program code to be loaded into a memory from a storage device to be configured to perform the operations.

For example, when processor unit 904 takes the form of a hardware unit, processor unit 904 may be a circuit system, an application specific integrated circuit (ASIC), a programmable logic device, or some other suitable type of hardware configured to perform a number of operations.

With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 918 may be omitted, because the processes for the different embodiments are implemented in a hardware unit.

In still another illustrative example, processor unit 904 may be implemented using a combination of processors found in computers and hardware units. Processor unit 904 may have a number of hardware units and a number of processors that are configured to run program code 918. With this depicted example, some of the processes may be implemented in the number of hardware units, while other processes may be implemented in the number of processors.

In another example, a bus system may be used to implement communications framework 902 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, memory 906, or a cache, such as found in an interface and memory controller hub that may be present in communications framework 902.

The description of the present disclosure has been presented for purposes of illustration and description and is not intended to be exhaustive or limited to the disclosure in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the disclosure, the practical application, and to enable others of ordinary skill in the art to understand the disclosure for various embodiments with various modifications as are suited to the particular use contemplated.

What is claimed is:

1. A method for managing solar power collection, the method comprising:
    identifying a position of a sun relative to an aerospace vehicle while the aerospace vehicle is moving along a flight path;
    identifying a level of power generation by a solar power generation system while the aerospace vehicle moves along the flight path using a threat management module and equivalent radar signature data, wherein the threat management module uses the equivalent radar signature data to identify the level of power generation by the aerospace vehicle from different positions of the sun relative to the aerospace vehicle, and the equivalent radar signature data is based on solar power generation signature data identifying the level of power generation for the different positions of the sun relative to the aerospace vehicle; and
    identifying a change in the flight path that results in a desired level of power generation by the solar power generation system.

2. The method of claim 1 further comprising:
    changing the flight path of the aerospace vehicle using the change.

3. The method of claim 1, wherein identifying the level of power generation by the solar power generation system while the aerospace vehicle moves along the flight path using the threat management module and the equivalent radar signature data comprises:
    identifying the level of power generation by the solar power generation system with the position of the sun being a position of a threat.

4. The method of claim 1, wherein identifying the change in the flight path that results in the desired level of power generation by the solar power generation system comprises:
    identifying the change in the flight path that results in the desired level of power generation by the solar power generation system and meets a number of parameters for a mission for the aerospace vehicle.

5. The method of claim 4, wherein identifying the change in the flight path that results in the desired level of power generation by the solar power generation system and meets the number of parameters for the mission for the aerospace vehicle comprises:
    identifying the change in the flight path that results in the desired level of power generation by the solar power generation system and meets the number of parameters for the mission for the aerospace vehicle, wherein the number of parameters comprises an area of observation, a predefined boundary, a target location, and a range of altitudes.

6. The method of claim 1 further comprising:
    performing identifying the level of power generation by the solar power generation system while the aerospace vehicle moves along the flight path using the threat management module and the equivalent radar signature data, wherein the threat management module uses the equivalent radar signature data to identify the level of power generation by the aerospace vehicle from the different positions of the sun relative to the aerospace vehicle, and the equivalent radar signature data is based on the solar power generation signature data identifying the level of power generation for the different positions of the sun relative to the aerospace vehicle and identifying the change in the flight path that results in the desired level of power generation by the solar power generation system in a computer system in the aerospace vehicle.

7. The method of claim 1 further comprising:
    performing identifying the level of power generation by the solar power generation system while the aerospace vehicle moves along the flight path using the threat management module and the equivalent radar signature data, wherein the threat management module uses the equivalent radar signature data to identify the level of power generation by the aerospace vehicle from the different positions of the sun relative to the aerospace vehicle, and the equivalent radar signature data is based on the solar power generation signature data identifying the level of the power generation for the different positions of the sun relative to the aerospace vehicle and identifying the change in the flight path that results in the desired level of power generation by the solar power generation system in a computer system in a location remote to the aerospace vehicle.

8. The method of claim 1, wherein the equivalent radar signature data are plots of radar responses for a plurality of azimuths and elevations in which the radar responses are from responses of power generation for the plurality of azimuths and elevations.

9. The method of claim 1 further comprising:
    inverting values for the solar power generation signature data to form the equivalent radar signature data.

10. The method of claim 1, wherein identifying the position of the sun relative to the aerospace vehicle while the aerospace vehicle is moving along the flight path comprises:
    identifying the position of the sun relative to the aerospace vehicle while the aerospace vehicle is moving along the flight path, wherein the aerospace vehicle is selected from one of an aircraft, an unmanned aerial vehicle, a manned aircraft, and a spacecraft.

11. An apparatus comprising:
    a flight management system configured to identify a position of a sun relative to an aerospace vehicle while the aerospace vehicle is moving along a flight path; identify a level of power generation by a solar power generation system while the aerospace vehicle moves along the flight path using a threat management module and equivalent radar signature data, wherein the threat management module uses the equivalent radar signature data to identify the level of power generation by the aerospace vehicle from different positions of the sun relative to the aerospace vehicle, and the equivalent radar signature data is based on solar power generation signature data identifying the level of power generation for the different positions of the sun relative to the aerospace vehicle; and identify a change in the flight path that results in a desired level of power generation by the solar power generation system.

12. The apparatus of claim 11, wherein the flight management system is further configured to change the flight path of the aerospace vehicle using the change.

13. The apparatus of claim 11, wherein in being configured to identify the level of power generation by the solar power generation system while the aerospace vehicle moves along the flight path using the threat management module and the equivalent radar signature data, the flight management system is configured to identify the level of power generation by the solar power generation system with the position of the sun being a position of a threat using the threat management module.

14. The apparatus of claim 11, wherein in being configured to identify the change in the flight path that results in the desired level of power generation by the solar power generation system, the flight management system is configured to identify the change in the flight path that results in the desired level of power generation by the solar power generation system and meets a number of parameters for a mission for the aerospace vehicle.

15. The apparatus of claim 14, wherein the number of parameters comprises an area of observation, a predefined boundary, a target location, and a range of altitudes.

16. The apparatus of claim 11, wherein the equivalent radar signature data are plots of radar responses for a plurality of azimuths and elevations in which the radar responses are from responses of power generation for the plurality of azimuths and elevations.

17. The apparatus claim 11 further comprising:
the aerospace vehicle.

18. The apparatus of claim 11, wherein the aerospace vehicle is selected from one of an aircraft, an unmanned aerial vehicle, a manned aircraft, and a spacecraft.

19. A computer program product comprising:
a computer readable storage media;
first program code for identifying a position of a sun relative to an aerospace vehicle while the aerospace vehicle is moving along a flight path;
second program code for identifying a level of power generation by a solar power generation system while the aerospace vehicle moves along the flight path using a threat management module and equivalent radar signature data, wherein the threat management module uses the equivalent radar signature data to identify the level of power generation by the aerospace vehicle from different positions of the sun relative to the aerospace vehicle, and the equivalent radar signature data is based on solar power generation signature data identifying the level of power generation for the different positions of the sun relative to the aerospace vehicle; and
third program code for identifying a change in the flight path that results in a desired level of power generation by the solar power generation system, wherein the first program code, the second program code, and the third program code are stored on the computer readable storage media.

20. The computer program product of claim 19 further comprising:
fourth program code for changing the flight path of the aerospace vehicle using the change, wherein the fourth program code is stored on the computer readable storage media.

* * * * *